United States Patent
Vecera et al.

(10) Patent No.: US 10,095,605 B2
(45) Date of Patent: Oct. 9, 2018

(54) DEBUGGER WRITE INTERCEPTOR

(71) Applicant: Red Hat, Inc., Raleigh, NC (US)

(72) Inventors: Martin Vecera, Brno (CZ); Jiri Pechanec, Mokra-Horakov (CZ)

(73) Assignee: RED HAT, INC., Raleigh, NC (US)

( * ) Notice: Subject to any disclaimer, the term of this patent is extended or adjusted under 35 U.S.C. 154(b) by 244 days.

(21) Appl. No.: 14/863,471

(22) Filed: Sep. 24, 2015

(65) Prior Publication Data

US 2017/0091066 A1 Mar. 30, 2017

(51) Int. Cl.
*G06F 9/44* (2018.01)
*G06F 11/36* (2006.01)

(52) U.S. Cl.
CPC .................................. *G06F 11/364* (2013.01)

(58) Field of Classification Search
CPC .................................................... G06F 11/364
See application file for complete search history.

(56) References Cited

U.S. PATENT DOCUMENTS

| | | | | |
|---|---|---|---|---|
| 5,611,043 A * | 3/1997 | Even | G06F 11/362 |
| | | | | 714/38.13 |
| 5,684,979 A * | 11/1997 | Grimes | G06F 12/0653 |
| | | | | 710/8 |
| 5,771,361 A * | 6/1998 | Tokieda | G06F 11/364 |
| | | | | 710/316 |
| 6,480,818 B1 * | 11/2002 | Alverson | G06F 11/362 |
| | | | | 703/26 |
| 6,795,833 B1 * | 9/2004 | Whipple, II | G06F 11/1435 |
| 6,876,466 B1 * | 4/2005 | Morikawa | G06T 1/60 |
| | | | | 358/1.14 |
| 7,007,205 B1 * | 2/2006 | Yeager | G06F 11/364 |
| | | | | 714/45 |
| 9,152,536 B1 * | 10/2015 | Fors | G06F 11/3624 |
| 2005/0165597 A1 * | 7/2005 | Nightingale | G06F 11/3672 |
| | | | | 703/27 |
| 2006/0179380 A1 * | 8/2006 | Tousek | G01R 31/31705 |
| | | | | 714/736 |
| 2007/0022322 A1 * | 1/2007 | Chen | G06F 11/3644 |
| | | | | 714/38.13 |
| 2008/0177974 A1 * | 7/2008 | Chiang | G06F 12/1036 |
| | | | | 711/173 |
| 2009/0307652 A1 * | 12/2009 | Maybee | G06F 11/3644 |
| | | | | 717/104 |

(Continued)

OTHER PUBLICATIONS

Dirk Vogt et al., "Lightweight Memory Checkpointing", [Online], 2015, pp. 1-11, [Retrieved from Internet on May 23, 2018], <https://www.cs.vu.nl/~herbertb/papers/lwmcp_dsn2015.pdf>.*

(Continued)

*Primary Examiner* — Ziaul A Chowdhury
(74) *Attorney, Agent, or Firm* — Haynes and Boone LLP (57) ABSTRACT

Methods, systems, and computer program products are included for executing one or more instructions of a program in a debugging session; receiving a command at a debugger, the command comprising an expression for the debugger to evaluate in the debugging session; evaluating the expression, at least in part by the debugger, the evaluating including attempting to perform a write operation to write a data value to a target; preventing the data value from being written to the target; and outputting, by the debugger, a result of the evaluating.

18 Claims, 4 Drawing Sheets

(56) References Cited

U.S. PATENT DOCUMENTS

| | | | |
|---|---|---|---|
| 2010/0306489 A1* | 12/2010 | Abts | G06F 11/0724 |
| | | | 711/163 |
| 2011/0066925 A1* | 3/2011 | Smith | G06F 11/10 |
| | | | 714/805 |
| 2012/0084758 A1* | 4/2012 | Bates | G06F 11/362 |
| | | | 717/125 |
| 2013/0007717 A1* | 1/2013 | Bates | G06F 11/362 |
| | | | 717/125 |
| 2013/0031292 A1* | 1/2013 | Van Riel | G06F 12/10 |
| | | | 711/6 |
| 2014/0331015 A1* | 11/2014 | Prasad | G06F 12/0891 |
| | | | 711/159 |
| 2015/0046908 A1* | 2/2015 | Salsamendi | G06F 21/566 |
| | | | 717/129 |
| 2015/0234669 A1* | 8/2015 | Ben-Yehuda | G06F 3/0604 |
| | | | 718/1 |
| 2016/0239404 A1* | 8/2016 | Williams | G06F 11/3644 |

OTHER PUBLICATIONS

Prashant Dewan et al., "A Hypervisor-Based System for Protecting Software Runtime Memory and Persistent Storage", [Online], 2005, pp. 1-8, [Retrieved from Internet on May 23, 2018], <http://vodun.org/papers/2008_secure_locker_submit_v1-1.pdf>.*

Amit Resh et al., "Preventing Execution of Unauthorized Native-Code Software", [Online], 2006, pp. 72-90, [Retrived from Internet on May 23, 2018], <https://jyx.jyu.fi/bitstream/handle/123456789/56815/jdcta3804ppl.pdf?sequence=1>.*

* cited by examiner

DEBUGGER WRITE INTERCEPTOR

BACKGROUND

A debugger is an application that is executed on a computer to test and/or debug a program. The debugger may step through instructions of the program, insert breakpoints into the program, halt execution of the program, display data corresponding to the program, modify data of the program, call functions of the program, evaluate expressions using the methods and data values of the program, and so forth. Generally these debugging features provide useful tools for a programmer to identify how the program operates in order to develop and improve the program. For example, the debugger may help a programmer identify a fault or "bug" in the program.

Traditional debuggers allow for evaluating expressions using the program. An expression may include values, variables, operators and functions corresponding to the program. For example, 1+1 could be an expression. 1+x could also be an expression. Expressions may specify functions of the program to be called. Expressions may also specify data values to input into functions, data values of variables to modify, and so forth. These are merely some examples (of many possible examples) of expressions.

Evaluation of expressions has the potential to cause side effects. Side effects include, for example, writing information to memory pages and files, reading data, sending data, and so forth. These side effects may change the state of the program and/or other programs that interact with the program in unwanted and/or unknown ways.

BRIEF SUMMARY

According to an example, a computer-implemented method includes executing one or more instructions of a program in a debugging session. The method further includes receiving a command at a debugger, the command comprising an expression for the debugger to evaluate in the debugging session. The method further includes evaluating the expression, at least in part by the debugger, the evaluating including attempting to perform a write operation to write a data value to a target. The method further includes preventing the data value from being written to the target. The method further includes outputting, by the debugger, a result of the evaluating.

According to an example, a non-transitory computer-readable medium includes computer-readable instructions, the computer-readable instructions executable by a processor to cause the processor to: create a process for debugging a program, the process to execute instructions of the program; protect a target from being written to by the process; evaluate an expression, the evaluating including executing a write instruction corresponding to the process, wherein the write instruction identifies a data value to write to the target; prevent the data value from being written to the target; receive a signal corresponding to the executing of the write instruction, the signal identifying that the process attempted to write to the target; and output, by the debugger, a result of the evaluating.

According to an example, a system includes a processor and a memory. The system further includes a debugger stored in the memory, the debugger executed by the processor to debug a program. The system further includes a write interceptor that is structured as an extension of the debugger, the write interceptor to: during an expression evaluation by the debugger, detect an attempt to write a data value to a target, wherein the write is attempted by a process corresponding to the program; prevent the data value from being written to the target by the process; copy content of the target to an alternate target; write the data value to the alternate target; and access the data value at the alternate target to evaluate the expression.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
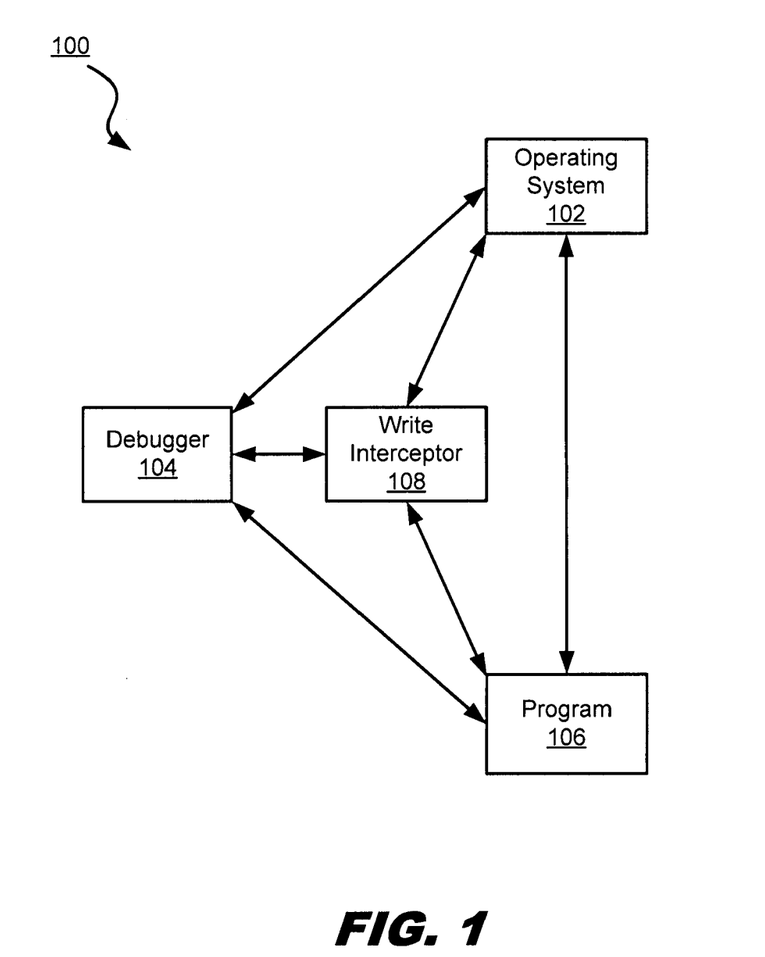
FIG. 1 is a block diagram illustrating a system architecture for performing debugging, in accordance with various examples of the present disclosure.

FIG. 1 illustrates a system architecture 100 for performing debugging, in which examples of the present disclosure can be implemented.

System architecture 100 includes an operating system 102, a debugger 104, a program 106 and a write interceptor 108. In the present example, these components are included in a machine, such as a computing device that includes hardware, software or a combination of both hardware and software. The components may also be included on a plurality of computing devices. For example, a first computing device may include operating system 102, debugger 104 and write interceptor 108 while a second computing device may include program 106.

In the present example, operating system 102 includes a kernel and runs applications such as debugger 104 and program 106. Operating system 102 may be any operating system, such as LINUX, UNIX, WINDOWS, OS X, and so forth.

In the present example, debugger 104 is a debugging tool that tests and debugs computer programs. In some examples, computer programs are compiled with debugging information included that allows the debugger to step through and execute portions of the computer programs. For example, the debugger 104 may trigger execution of the computer programs on a line by line basis, set breakpoints, and examine variable values and stack traces. Debugger 104 also may watch variables of computer programs, modify variables of programs, and perform expression evaluation. In some examples, debugger 104 is structured to access source code of a computer program while the program is being debugged. For example, the debugger may display the code instructions of the computer program while the program is being debugged.

In the present example, debugger 104 is structured to interact with operating system 102, such as by calling functions of the operating system 102, and being loaded into memory and executed by the operating system 102. For example, operating system 102 may configure a process corresponding to the debugger 104 that executes instructions from a debugger 104 application stored in memory.

In the present example, program 106 is a computer program that is accessed by debugger 104 to debug and/or test the program. In some examples, program 106 is an executable file, process, object code, source code, or any combination thereof. Program 106 may also include a plurality of executable files, processes, object code files, and source code files.

In the present example, program 106 is structured to interact with operating system 102, such as by calling functions of the operating system 102, and being loaded into memory and executed via the operating system 102. For example, operating system 102 may configure a process corresponding to the program 106 that executes instructions from the program 106. Program 106 is structured to interact with debugger 104, such as by having debugger 104 access the program 106 and control execution of program 106. For example, the debugger 104 may examine the operation of the program 106, set breakpoints at positions in the program, and so forth. In some examples, program 106 interacting with debugger 104 is referred to as a debugging session. A debugging session may comprise debugger 104 interacting with program 106 to watch execution and/or data of the program 106, debug the program 106, and/or test the program 106.

In the present example, write interceptor 108 is structured to detect writes corresponding to the program 106 that is being debugged by debugger 104. In some examples, write interceptor 108 is structured as an extension of debugger 104. In other examples, write interceptor 108 is structured as one or more software functions or modules of debugger 104. In yet other examples, write interceptor 108 is structured as a separate application from debugger 104. Write interceptor 108 may be structured to be executed in a same process as debugger 104 or in a separate process.

Write interceptor 108 is structured to detect execution of an instruction of program 106 to write to a memory page, such as an attempt to perform a write operation to modify a variable stored in the memory page. Write interceptor 108 is also configured to detect execution of an instruction of program 106 to attempt to perform a write operation to write data to a file or to a network socket.

In the present example, write interceptor 108 is structured to interact with debugger 104, program 106 and/or operating system 102 in order to detect write operations corresponding to program 106.

In the present example, write interceptor 108 is structured to call functions of operating system 102 to protect particular memory pages, files and/or network sockets from being written to, for example by a write operation. A write operation may be for example, one or more write instructions that are executed by a process. A write instruction does not require successful execution in order to be considered a write operation. For example, a write instruction that is executed, but that is prevented from performing the write is still referred to as a write operation. That is, whether the target of the write is written to does not affect whether the execution of the write instruction is referred to as a write operation. A write operation may also be referred to as a write request.

Write interceptor 108 is structured to receive signals from operating system 102 regarding write operations, such as attempts to write to memory pages, files, and/or network sockets by program 106 or a process corresponding to program 106. Write interceptor 108 may also be structured to redirect writes from memory pages, files, and/or network sockets to other targets. For example, a write operation that targets a first memory page may be redirected to a second memory page, such as by calling an operating system function to create the second memory page and executing a write instruction to write to on the second page. A write operation that targets a first file may be redirected to a second file, such as by calling an operating system function to create the second file and executing a write instruction to write to the second file.

In the present example, write interceptor 108 is structured to interact with debugger 104, such as being triggered by the debugger when an evaluate expression command is received by the debugger. In other examples, write interceptor 108 is structured to be loaded and executed with debugger 104 at runtime during a debugging session.

Write interceptor 108 is structured to interact with program 106, such as by reading information from program 106. For example, if program 106 includes an instruction to write information to a first memory page, write interceptor 108 may read the information from program 106 or process corresponding to program 106 in order to write the information to a second memory page.

Figure 2:
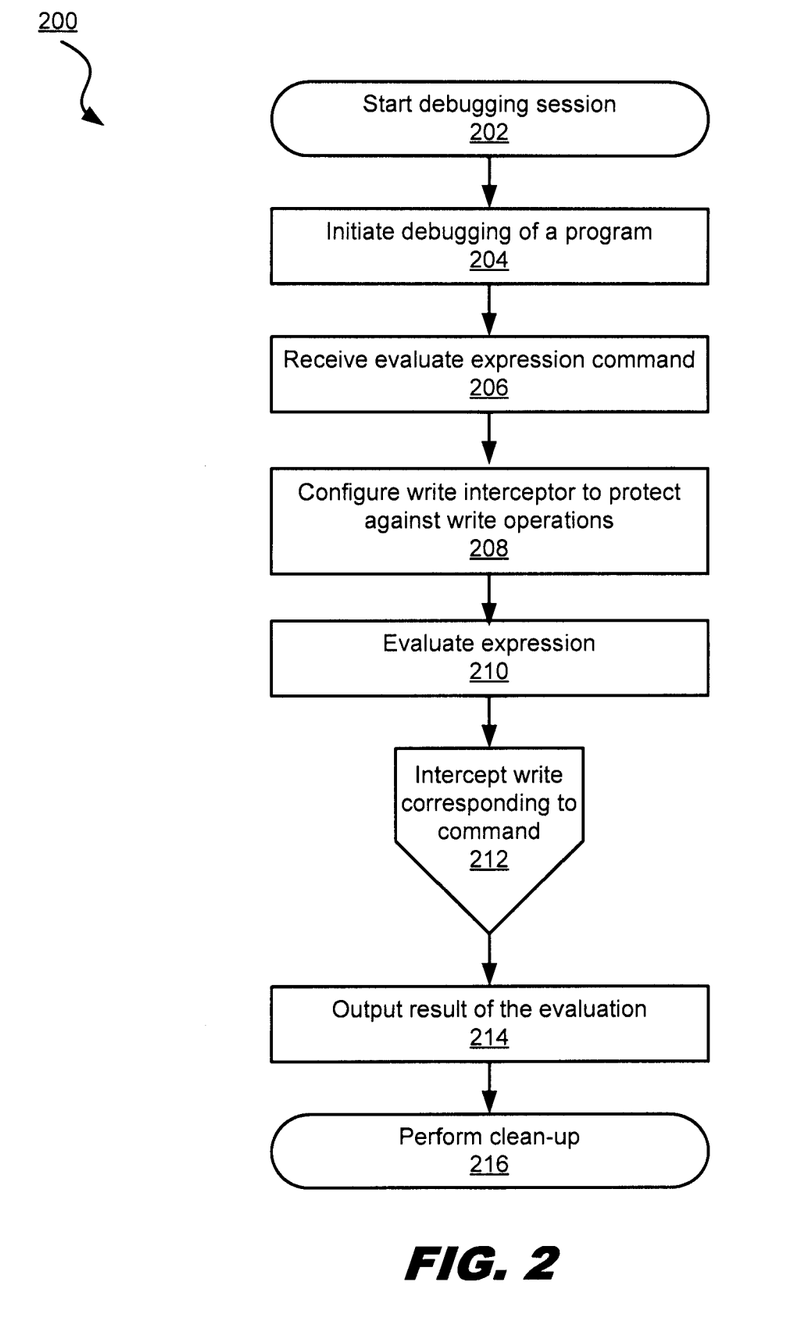
FIG. 2 is a flow diagram illustrating an evaluation of an expression, in accordance with various examples of the present disclosure.

FIG. 2 is a flow diagram illustrating a method for evaluating an expression, according to some examples of the present disclosure. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. Additional steps can be provided before, during, and after the steps of method 200, and that some of the steps described can be replaced, eliminated and/or re-ordered for other embodiments of the method 200. Method 200 may be performed, for example, by one or more automated and/or user-operated software tools.

At action 202, a debugging session is started. In some examples, starting a debugging session refers to executing a debugger application. The debugger application may be executed, for example, by an operator selecting the debugger application via a graphical user interface or by entering a command to execute the debugger application in a command line interface.

At action 204, the debugging of a program is initiated. In the present example, the debugging of the program includes creating a process corresponding to the program and having the process execute one or more instructions of the program. The process executing the program may also be referred to as an instance of the program. In some examples, debugging of a program is initiated from the debugger. For example, the program name may be input as an argument when starting the debugger. In another example, during runtime of the debugger the program may be selected for debugging using a graphical user interface or a command line interface. The debugging of the program by the debugger may be referred to as occurring during a debugging session. The term "session" is meant to be interpreted broadly to include any interaction of a debugger with a program. For example, a debugger loading a program for debugging is a debugging session. In another example, a debugger watching or executing a process is a debugging session.

At action 206, a command is received to evaluate an expression. Receiving a command may also be referred to as inputting a command. In some examples, the command is input/received at a debugger while execution of the program is halted. For example, a program may be at a breakpoint. In the present example, a user may type in or select an evaluate expression command at an interface such that the debugger may receive the command from the user. In another example, a user may enter an evaluate expression command prior to initiating execution of the program and configure the command to be executed by the debugger once the program reaches a particular location in the program. For example, the user may input or select an expression for the debugger to receive and evaluate at a particular breakpoint. In other examples, an evaluate expression command may be pre-configured, such that the command is input into the debugger by the debugger itself or another program. For example, the debugger may provide a library of pre-defined expressions that may be selected by a user or that may be selected by the debugger based on a pre-configured trigger.

At action 208, a write interceptor is configured. In the present example, configuring a write interceptor includes calling a function of an operating system to protect one or more particular memory pages, files and/or network sockets from data writes. For example, a memory page, file and/or network socket may be set to read-only, or have write access removed, such that an attempt to perform a write operation to modify a data value corresponding to the memory page, file and/or network socket will not be performed. In some examples, the write detector is configured to determine which memory pages, files and/or network sockets by matching the memory pages, files, and/or network sockets with resources assigned to the program, such as the program's memory space, directories assigned to the program, processes assigned to the program, and so forth. For example, the write interceptor may input the memory address space corresponding to the program into an operating system function that removes write access to the memory address space.

In some examples, upon attempting to write to the memory page, file and/or network socket, an error message or other signal may be triggered that identifies that the write was not successful. For example, the operating system may signal a segmentation fault if a write operation is executed that targets a protected memory page, file and/or network socket. In some examples, configuring a write interceptor includes configuring one or more handlers to detect attempted writes to the memory page, file and/or network socket corresponding to the program. For example, a write interceptor may be configured with a handler that receives a signal from an operation system when a write is attempted to the memory page, file and/or network socket. In some examples, the signal identifies the process that attempted to perform the write, such that the write detector may identify from the signal that the process that attempted to perform the write is the process that corresponds to the program being debugged. For example, a process identifier associated with the signal may be matched to a process identifier of a process of the program being debugged.

In some examples, a separate write interceptor is configured corresponding to each type of data access. For example, the write interceptor may include a first write interceptor that corresponds to memory pages, a second write interceptor that corresponds to files and a third write interceptor that corresponds to network sockets. In some examples, configuring a write interceptor includes providing one or more handlers to receive signals from the operating system regarding attempted write operations, such that the handlers may detect and respond to the attempted write operations. In other examples, configuring one or more write interceptors may include providing one or more interrupt handlers to monitor for interrupts corresponding to write operations.

In other examples, the configuration of the write interceptor may occur prior to or simultaneous with receiving the evaluate expression command. For example, configuring the write interceptor may occur during one or more of steps 202, 204 and 206. In another example, a user may configure the write interceptor at any time during the debugging session by inputting a command that is received by the debugger.

At action 210, the expression received by the debugger is evaluated by the debugger. In some examples, the debugger interacts with the program to evaluate the expression such as by executing methods and functions of the program, reading data values of variables of the program, writing data values to variables of the program, and so forth. For example, if the expression includes a function call and specifies a particular data value to input to the function call, the instructions of the function may be executed with the particular data value that was input, and the output of the function may be provided as the result of the expression. In another example, if the expression includes a calculation that includes data values of variables of the program, the data values may be read from the variables and the calculation performed using the data values.

In the present example, while the expression is being evaluated, the write interceptor is configured to intercept write operations corresponding to the evaluating of the expression, as is discussed in more detail with respect to action 212. Accordingly, steps 210 and 212 are illustrated in an order, in this example, but these steps may be performed concurrently or in another order.

At action 212, a write interceptor intercepts a write corresponding to the evaluate expression command that was received by the debugger. For example, if the evaluate expression command invokes a function of the program, a write triggered by instructions in that function is intercepted by the write interceptor. In another example, if the evaluate expression command writes a data value to a variable of the program, then the write operation is intercepted by the write interceptor. A write operation to a variable of the program may be attempted in order to modify a value of data corresponding to the program.

In some examples, the write interceptor is notified by a signal received from the operating system that a write operation was attempted by a process corresponding to the program. For example, the write interceptor may be configured to prevent access to a particular memory page, file or network socket, such as by inputting the target memory page, file or network socket into a function call to the operating system. Accordingly, when the memory page, file or network socket is attempted to be accessed by a write operation, the operating system may generate a signal, such as a segmentation fault, permission denied message, and/or other signal, that is received by a signal handler of the write interceptor. The receiving of the signal at the write interceptor may be referred to as detecting the write operation. In other examples, detecting a write operation may include other methods as well, such as monitoring interrupts from the CPU, parsing code of the program by the debugger prior to executing the code, and so forth.

In some examples, the write interceptor includes one or more handlers to perform actions responsive to detecting a write operation. For example, the write interceptor may include a first handler to respond to memory page writes, a second handler to respond to file writes and a third handler to respond to network socket writes.

Figure 3:
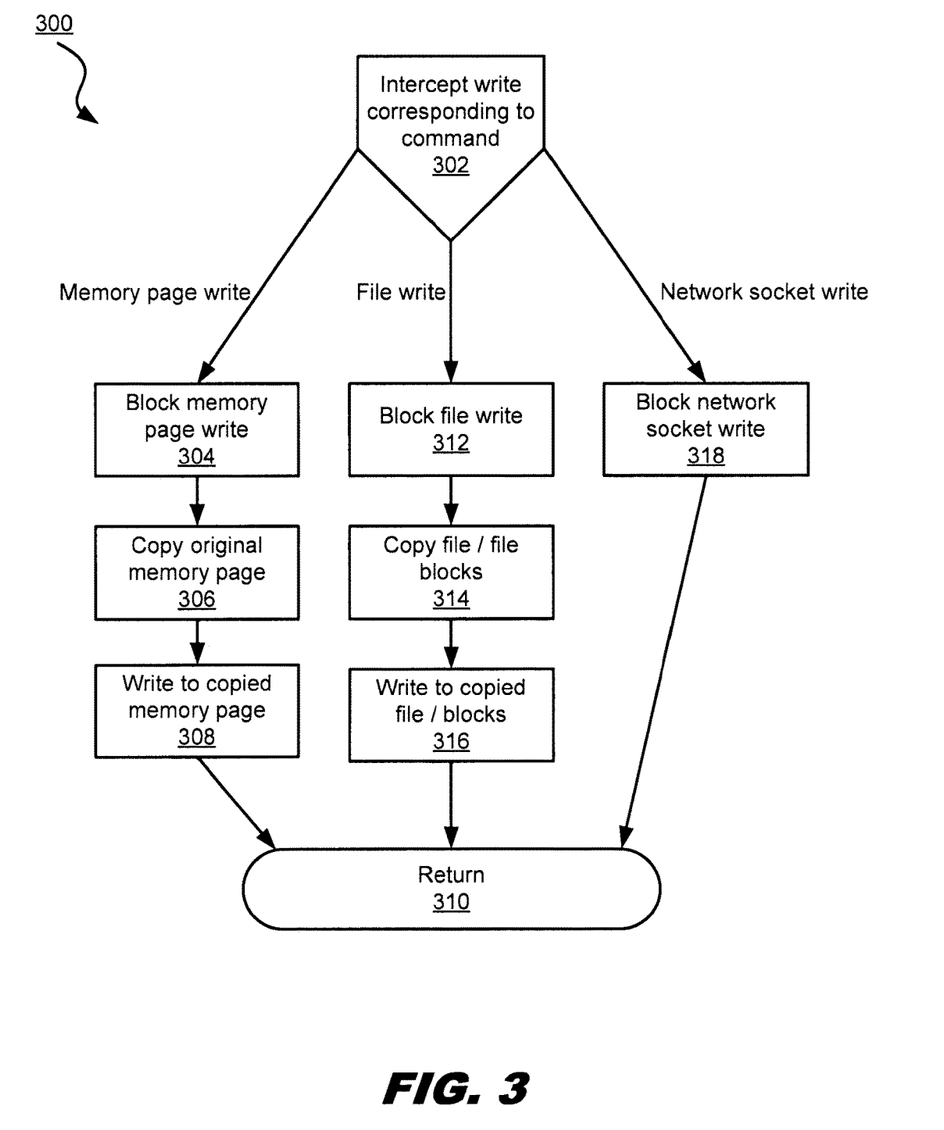
FIG. 3 is a flow diagram illustrating a method for intercepting data writes, in accordance with various examples of the present disclosure.

FIG. 3 illustrates further examples of actions that may be performed by the write interceptor to intercept a write operation corresponding to a memory page write, file write and network socket write. In the present example, the write interceptor is triggered with each write operation that is attempted corresponding to the program. Accordingly, the steps illustrated in FIG. 3 may be performed for each write operation attempt. For example, if write operations are detected for a plurality of memory pages, each memory page may be copied, and the write operations performed on the plurality of memory page copies, as is discussed in more detail with respect to FIG. 3.

At action 214, the result of the evaluation is output by the debugger. In some examples, the result of the expression is output on a user interface and displayed to a user. In other examples, the result of the expression is output to a function of the debugger, or to another application.

At action 216, clean-up corresponding to the write interceptor is performed. For example, if the write interceptor(s) created memory pages, files, file blocks, and so forth, these created entities may be discarded. For example, if a write interceptor created a memory page, the write interceptor may discard the memory page by calling an operating system function to free the memory page.

FIG. 3 is a flow diagram illustrating a method for intercepting data writes, according to some examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. Additional steps can be provided before, during, and after the steps of method 300, and that some of the steps described can be replaced, eliminated and/or re-ordered for other embodiments of the method 300. Method 300 may be performed, for example, by one or more automated and/or user-operated software tools.

At action 302, one or more write interceptors intercept a write operation. In some examples, the write operation is initiated by executing an instruction of a program during a debugging session. In some examples, a write interceptor includes a plurality of handlers, with a particular handler being triggered based on the target of the write operation. For example, if the write operation targets a memory page, then actions 304, 306 and 308 are performed. If the write operation targets a file, then actions 312, 314 and 316 are performed. If the write operation targets a network socket, then action 318 is performed. In some examples, the write interceptor includes a handler that detects a signal from an operating system in order to detect and/or determine the type of target of the write operation, and responds by performing actions to intercept a memory page write, file write or network socket write based on the type of target detected and/or determined.

In some examples, each write operation is intercepted at block 302 on an individual basis, and actions performed responsive to the individual write operation. In other examples, a plurality of write operations may be processed concurrently.

At action 304, the write interceptor processes a memory page write operation. The memory page write operation is blocked from writing information to a target memory page. In some examples, the write interceptor calls an operating system function to modify access privileges of one or more of the memory pages of a program to remove write access. Accordingly, write operations are prevented from writing to the one or more memory pages of the program.

At action 306, upon detecting the write operation, such as by receiving a signal from the operating system indicting the write operation, the write interceptor copies the memory page that is the target of the write operation to a second memory page. Accordingly, the second memory page is a copy of the target memory page.

At action 308, the information, such as one or more data values, that the write operation attempted to write to the target memory page is written to the second memory page. This may be referred to as redirecting the write operation to the second memory page.

At action 310, the write interceptor may return operation to the debugger to evaluate the expression using the data written in the second memory page. Further, the write interceptor may process additional write operations corresponding to the evaluation of the expression. For example, a process that executes the program to evaluate the expression may result in a plurality of write operations. Accordingly, each write operation may be intercepted and handled as discussed above.

At action 312, the write interceptor processes a file write operation. The file write is blocked from writing information to a target file. In some examples, the write interceptor calls an operating system function to modify access privileges of one or more files corresponding to a program to remove write access. Accordingly, write operations are prevented from writing to the files.

At action 314, upon detecting the write operation, such as by receiving a signal from an operating system indicating the write operation, the write interceptor copies the file that is the target of the write operation to a destination location, such as by copying all data blocks of the file to the destination. In other examples, the write interceptor may copy a subset portion of the data blocks of the file to the destination. For example, the file blocks of the file that are to be modified may be copied to the destination. In some examples, the destination is another file, such as by copying the file to a second file. In other examples, the destination is a memory page.

At action 316, the information, such as one or more data values, that the write operation attempted to write to the target file is written to the destination. This may be referred to as redirecting the write operation.

At action 318, the write interceptor processes a network socket write operation. The write operation is blocked from writing information to a target network socket. In some examples, the write interceptor calls an operating system function to modify access privileges of the network socket to remove write access. Accordingly, write operations are prevented from writing to the network socket. In some examples, the write interceptor prevents write access to the network socket by receiving the write operation but not processing it to perform the write operation.

Figure 4:
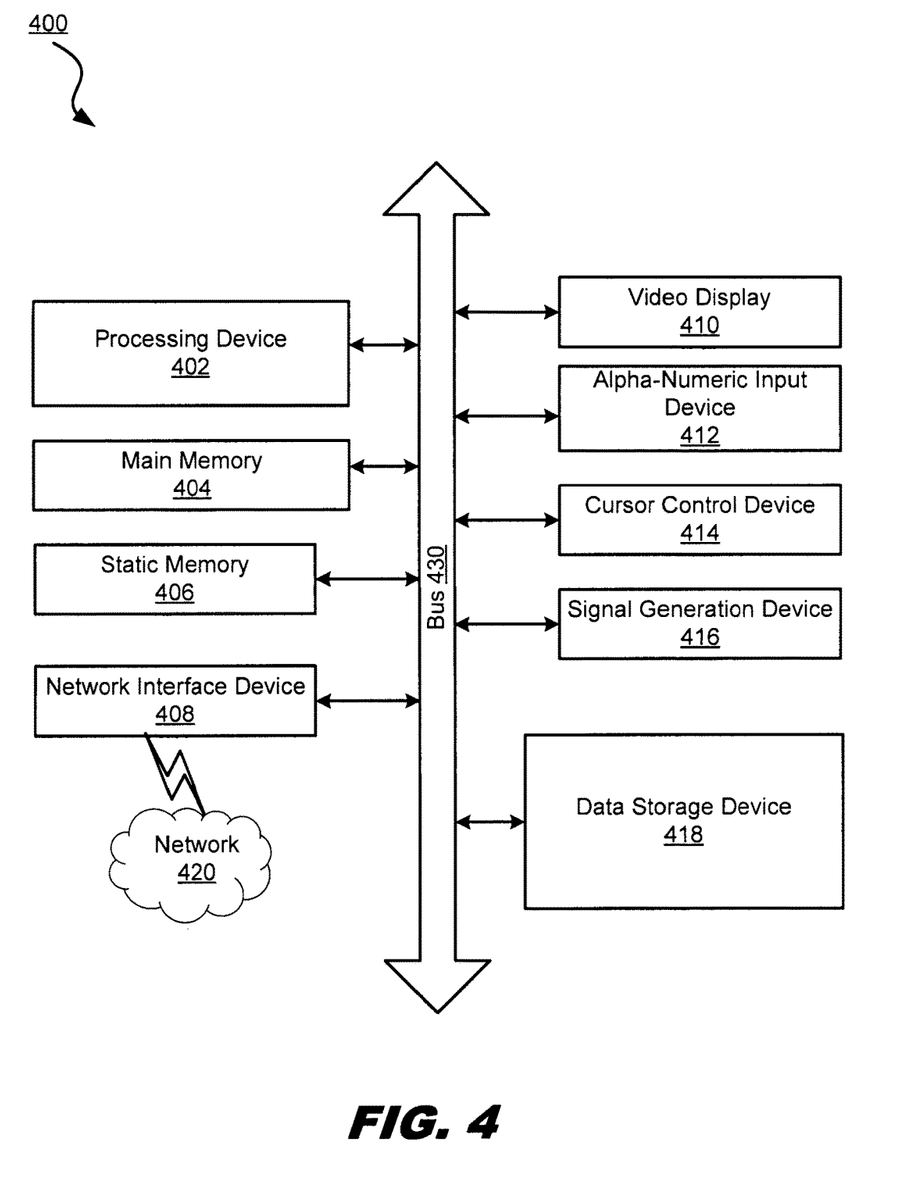
FIG. 4 is a block diagram illustrating a computer system that may perform one or more of the operations described herein.

FIG. 4 illustrates a diagram of a machine in the form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like.

More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method for performing debugging of an application, the method comprising:
   executing one or more instructions of a program in a debugging session;
   receiving a command at a debugger, the command comprising an expression for the debugger to evaluate in the debugging session;
   evaluating the expression, at least in part by the debugger, the evaluating including attempting to perform a write operation to write a data value to a target;
   identifying, by the write operation, a memory page as the target;
   with a write interceptor, preventing the data value from being written to the target, the write interceptor being triggered by the debugger, wherein the write interceptor is structured as an extension of the debugger;
   copying contents of the memory page to a second memory page;
   writing the data value to the second memory page, the writing of the data value to the second memory page occurring during the evaluating of the expression;
   reading the data value from the second memory page;
   discarding the second memory page after the expression is evaluated; and
   outputting, by the debugger, a result of the evaluating.

2. The method of claim 1, the method further comprising:
   the write operation identifying a file as the target;
   copying contents of the file to a second file; and
   writing the data value to the second file.

3. The method of claim 1, wherein the write operation identifies a network socket as the target.

4. The method of claim 1, the method further comprising:
   detecting the attempt to perform the write operation, the detecting comprising receiving a segmentation fault signal from an operating system.

5. The method of claim 1, the method further comprising:
   setting write protection for the target to prevent write access to the target;
   after setting the write protection, detecting the attempt to perform the write operation to write to the target; and
   after detecting the attempt to perform the write operation, writing the data value to a different location than the target.

6. The method of claim 5, the setting of write protection for the target comprising:
   inputting to an operating system function a memory address that includes the target.

7. The method of claim 1, further comprising:
   the write operation identifying a file as the target;
   copying a subset of data blocks of the file to a destination; and
   writing the data value to the subset of the data blocks at the destination.

8. A non-transitory computer-readable medium, comprising computer-readable instructions for debugging an application, the computer-readable instructions executable by a processor to cause the processor to:
   create a process for debugging a program, the process to execute instructions of the program;
   protect a target from being written to by the process;
   evaluate an expression, the evaluating including executing a write instruction corresponding to the process, wherein the write instruction identifies a data value to write to the target;
   identify, by the write instruction, a memory page as the target;
   with a write interceptor, prevent the data value from being written to the target, the write interceptor being triggered by the debugger, wherein the write interceptor that is structured as an extension of the debugger;
   receive a signal corresponding to the executing of the write instruction, the signal identifying that the process attempted to write to the target;
   copy contents of the memory page to a second memory page;
   write the data value to the second memory page, the writing of the data value to the second memory page occurring during the evaluating of the expression;
   read the data value from the second memory page;
   discard the second memory page after the expression is evaluated; and
   output, by the debugger, a result of the evaluating.

9. The medium of claim 8, the computer-readable instructions executable by a processor to cause the processor further to:
   after receiving the signal, copy content of the target; and
   write the data value to the copy of the content.

10. The medium of claim 9, wherein evaluating the expression includes reading the data value from the copy of the content.

11. The medium of claim 10, wherein the target is a memory page and the copy of the content is stored on a second memory page.

12. The medium of claim 11, the computer-readable instructions executable by a processor to cause the processor further to:
    after reading the data value from the copy of the content, discard the second memory page.

13. The medium of claim 8, wherein the target is a file.

14. The medium of claim 8, wherein the target is a network socket.

15. A system comprising:
    a processor and a memory;
    a debugger stored in the memory, the debugger executed by the processor to debug a program;
    a write interceptor that is structured as an extension of the debugger, the write interceptor to:
       during an expression evaluation by the debugger, detect an attempt to write a data value to a target, wherein the write is attempted by a process corresponding to the program;
       prevent the data value from being written to the target by the process, the write interceptor being triggered by the debugger;
       copy content of the target to an alternate target;
       write the data value to the alternate target, the writing of the data value to the second memory page occurring during the expression evaluation;
       access the data value at the alternate target to evaluate the expression; and
       discard the alternate target after the expression is evaluated.

16. The system of claim 15, wherein the target is a memory page in the address space assigned to the process.

17. The system of claim 15, wherein the target is a file.

18. The system of claim 15, wherein the data value corresponds to a variable of the program.

* * * * *